April 2, 1963 G. E. GROSS 3,083,538
APPARATUS FOR MAINTAINING A BODY OF WATER FREE OF ICE
Filed Oct. 6, 1958
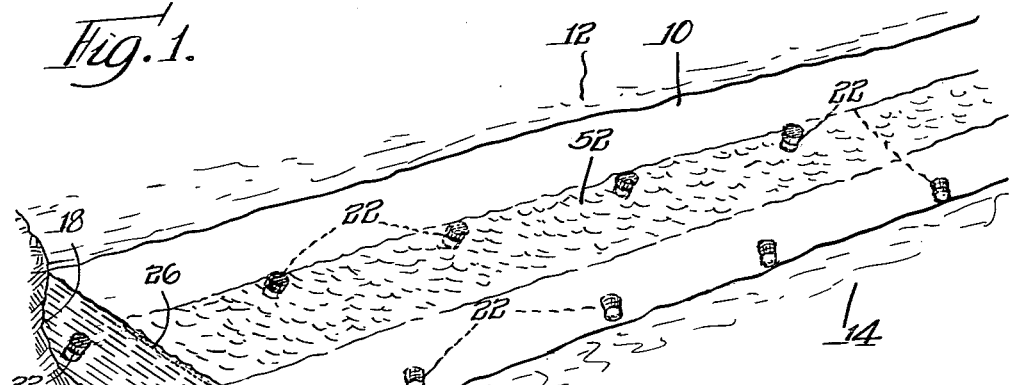
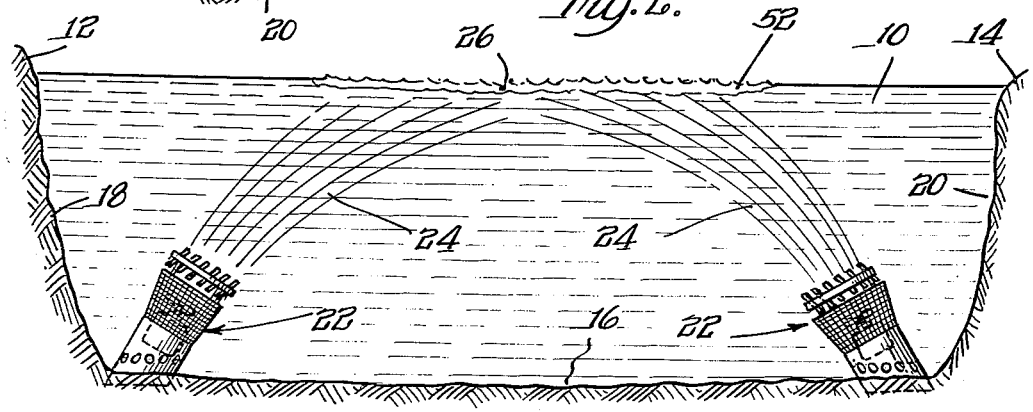
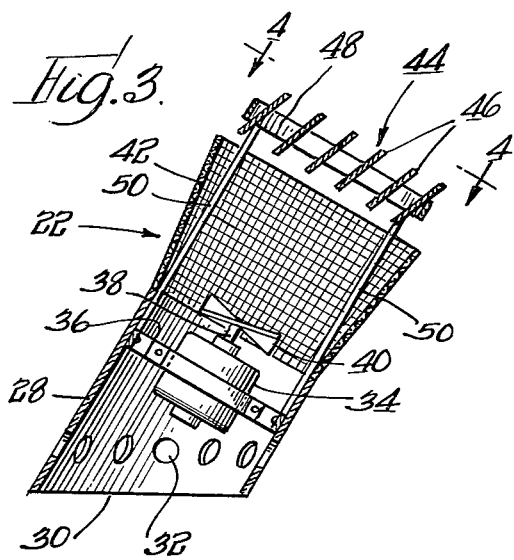
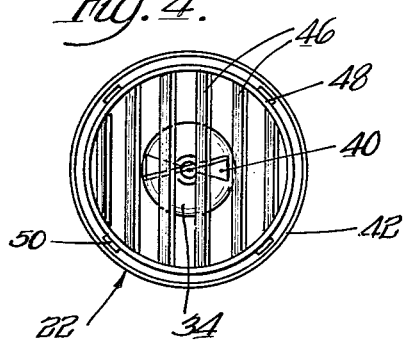
INVENTOR.
George E. Gross
BY: Olson & Trexler
attys.

3,083,538
Patented Apr. 2, 1963

3,083,538
APPARATUS FOR MAINTAINING A BODY OF
WATER FREE OF ICE
George E. Gross, 836 S. Maple St., Oak Park, Ill.
Filed Oct. 6, 1958, Ser. No. 765,666
7 Claims. (Cl. 61—1)

This invention is concerned with the maintenance of water, as in rivers, lakes and the like, free of ice preferably by preventing the formation of ice.

As will be apparent, there are many disadvantages in frozen over bodies of water, such as rivers, lakes, and the like. Obviously navigation is prevented or seriously impeded. Shifting of ice masses, and also expansion of the water as it freezes causes extensive damage to shore installations and to any boats left in the water. Additionally, complete freezing of the surface of a body of water causes what is known as "winter kill" of fish by excluding oxygen from the surface of the water. The addition of sufficient heat to prevent freezing of any but the very smallest bodies of water is obviously impractical.

It is known that a body of water generally will not freeze below the first foot or so, and that the water near the bottom is generally well above freezing temperature (water has a maximum density at 39.2° F.). Efforts previously have been made to mix the warmer lower water with the upper colder water by bubbling air up through the water. This requires large expenditures of power and even then does not work too well as it requires extensive mixing of the relatively warm sub-surface water with the surface water.

I have found that the warmer sub-surface water can be used much more effectively with a minimal expenditure of power. I have observed that water at different temperatures appears to have different viscosities and resists mixing. This tendency must be overcome by the bubbling processes of the prior art.

As disclosed in my copending application entitled "Method and Apparatus For Preventing and Controlling Formation of Ice," Serial Number 736,155, filed May 19, 1958, now abandoned, I have heretofore directed small jets of sub-surface water up to the surface, the warmer water thus rising without mixing and spreading out as a relatively warm layer on the surface.

Accordingly, it is an object of this invention to provide improved apparatus for maintaining water free of ice.

More specifically, it is an object of this invention to provide such apparatus in the form of a self contained unit.

Another object of this invention is to provide a system of a plurality of self contained pumping units for maintaining a river or the like free of ice.

Other and further objects and advantages of the present invention will be apparent from the following description when taken in connection with the accompanying drawings wherein:

FIG. 1 is a perspective view of a river with a plurality of pumping units therein in accordance with this invention;

FIG. 2 is a cross sectional view through the river;

FIG. 3 is a detail side view of one of the pumping units; and

FIG. 4 is an end view of the unit as taken along the line 4—4 in FIG. 3.

Referring now in greater particularity, and first to FIGS. 1 and 2, there will be seen a river indicated at 10 and having opposite banks 12 and 14. The river has a bottom 16 with upwardly sloping sidewalls 18 and 20. A plurality of pumping units 22 is positioned in spaced pairs along the bottom 16 of the river adjacent the sloping sidewalls 18 and 20. The pumping units are so constructed and oriented, as hereinafter set forth, as to direct streams 24 of warmer water from the bottom of the river up toward the surface more or less along the center of the river, whereby to maintain the channel 26 free of ice. The edges of the surface laterally outwardly of the channel may also be kept ice free, if so desired.

Each pumping unit, referring now more particularly to FIGS. 3 and 4, comprises a sheet metal base 28, preferably of corrosion resistant material, such as stainless steel. The bottom of the base is oblique or inclined as indicated at 30 whereby the entire unit is in an inclined or tipped position when resting on the river bottom. The bottom of the base may be embedded in concrete, but for most installations it is sufficient to force the bottom of the base into the mud or gravel or other material forming the river bottom 16.

The base is provided with a ring of arcuately spaced holes 32 that are positioned above the river bottom with the unit in installed position and which serve as water intakes. A sealed fractional horsepower electric motor 34 is supported by a bracket 36 on the axis of the base near the upper edge thereof. The motor 34 preferably includes a built-in gear reducer to drive the output shaft 38 at a rather low speed. A rather small propeller 40 is mounted on the shaft 38, and is somewhat similar in configuration to the screw of a ship or a boat, rather than being similar to a fan.

The pumping unit 22 is provided with a shroud 42 comprising screen wire in the form of a cylinder (or slightly flaring, as shown) secured to the upper edge of the base 28 and extending upwardly therefrom beyond the propeller 40. The screen or shroud 42 keeps marine life and debris away from the propeller 40. Additionally, it serves as a duct for water propelled by the unit. The interstices of the shroud are rather small and water is sufficiently coherent that the shroud is capable of acting as a duct, as opposed to the relatively open guards commonly used on ventilating fans.

In addition, the pumping unit 22 is provided with water directing means 44 above the shroud 42 comprising a plurality of vanes or blades 46 held by a frame 48 supported by brackets 50 extending up from the base 28. The vanes preferably are adjustably mounted on the frame and are parallel to the center line of the river. Alternatively, the vanes could be factory-fixed in the necessary position for any given installation.

The pumping units can be automatically turned on and off by time or temperature controlled means (not shown) mounted in the water, or can be automatically or manually controlled from the shore. Water is picked up from near the bottom of the river through the holes 32. A certain amount of water also may be pulled up from below the bottom of the river, particularly when the river has a gravel bottom. All of the water picked up is above freezing temperature, generally by at least several degrees. This water is directed by the duct or shroud 42 and by the blades or vanes 46 up toward the center or channel 26 of the river along the paths indicated at 24. As heretofore indicated, water at different temperatures does not readily mix, and accordingly there is substantially no appreciable spreading out or diffusion of the relatively warm streams 24 of water. However, when the warm water reaches the surface, it spreads out as a relatively warm surface layer 52 maintaining the channel 26 free of ice. The pumping units in most instances need be operated only intermittently, even during the coldest weather. Incidentally, they should be operated for a few minutes every week or so during the summer to clean silt and the like from the propellers.

The sealed motor units are readily available in commerce at reasonable prices, and the remaining parts being mostly sheet metal and screen wire, can be fabricated and assembled at low cost. As will be apparent, it is generally preferable to use corrosion resistant materials throughout. Installation costs are moderate, and operational costs will be only several dollars per unit per year. Thus, at low cost, navigable waters can be kept open throughout the year, at great economic gain.

The specific example of the invention as set forth herein is illustrative only. Various changes in structure will no doubt occur to those skilled in the art, and are to be considered as a part of this invention insofar as they fall within the spirit and scope of the appended claims.

The invention is claimed as follows:

1. For use in maintaining the surface of a body of water free of ice, there being a bottom of earth or the like beneath said body of water, a self-contained water moving unit comprising a circular housing, a submersible motor unit having an output shaft, means mounting said motor unit in said housing, means for mounting said housing in predetermined position from said bottom at a substantial distance below the surface of said body of water, with said output shaft tipped up toward the surface and an axial thrust propeller on said output shaft, said housing having a water outlet aligned with said propeller on the thrust side thereof and further having water inlet means, said housing being substantially larger in diameter than said propeller, said propeller, said motor unit, and said housing including the inlet means and outlet thereof being spaced from the surface of said body of water and moving water from the depth of said water moving unit to the surface as a stream free of mechanical restraint and without substantial mixing of the moved water with the surrounding body of water, the moved water spreading out as a protective layer on the surface of said body of water.

2. A self-contained water circulating unit as set forth in claim 1 wherein the housing in the plane of the propeller is substantially larger in diameter than the propeller.

3. For use in maintaining the surface of a body of water free of ice, there being a bottom of earth or the like beneath said body of water, a self-contained water moving unit comprising an annular housing which is at least in part of perforate material, a water-tight sealed motor unit having an output shaft, means mounting said motor unit in said housing, means for mounting said housing in predetermined position from said bottom at a substantial distance below the surface of said body of water, and an axial thrust blade-type propeller on said output shaft, said housing having a water outlet aligned with said propeller on the thrust side thereof and further having water inlet means, and the plane of said propeller intersecting the perforate material of said housing, said propeller, said motor unit, and said housing including the inlet means and outlet thereof being spaced from the surface of said body of water and moving water from the depth of said water moving unit to the surface as a stream free of mechanical restraint and without substantial mixing of the moved water with the surrounding body of water, the moved water spreading out as a protective layer on the surface of said body of water.

4. A self-contained water circulating unit as set forth in claim 3 wherein the housing is of substantially larger diameter than the propeller.

5. A self-contained water circulating unit as set forth in claim 4 wherein the housing in the plane of the propeller is substantially larger in diameter than the propeller.

6. A system for keeping a body of water ice-free within a predetermined area, there being a bottom of earth or the like beneath said body, comprising a plurality of like self-contained water moving units disposed in spaced relation on said bottom, and each spaced in its entirety from the surface of said body of water, each of said water moving units including means for pumping relatively warmer water from adjacent said bottom as a stream free of mechanical confinement to the surface of said body without substantial mixing of the pumped water with the surrounding body of water to spread out as a relatively warmer layer on said surface.

7. The method of maintaining a body of water free of ice which comprises disposing a self-contained water moving unit in such a body of water entirely at a substantial distance below the surface thereof, and utilizing said unit to move relatively warmer water free of mechanical confinement from said body at said substantial distance below the surface thereof and to direct the relatively warmer moved water as a stream free of mechanical confinement to the surface of said body without effecting any substantial mixing between the moving water and that of the surrounding body of water, said moved water spreading out on the surface as a protective layer.

References Cited in the file of this patent
UNITED STATES PATENTS

| | | |
|---|---|---|
| 1,328,010 | Nelson | Jan. 13, 1920 |
| 1,786,009 | Duwe | Dec. 23, 1930 |
| 1,789,320 | Overbury | Jan. 20, 1931 |
| 1,807,397 | Fechheimer | May 26, 1931 |
| 2,029,153 | Burner | Jan. 28, 1936 |
| 2,190,945 | Guth | Feb. 20, 1940 |
| 2,274,274 | Pezzillo | Feb. 24, 1942 |
| 2,361,404 | Kalix | Oct. 31, 1944 |
| 2,460,757 | Kurz | Feb. 1, 1949 |
| 2,631,543 | Richmond | Mar. 17, 1953 |
| 2,791,406 | Bates | May 7, 1957 |
| 2,795,388 | Myers | June 11, 1957 |
| 2,827,268 | Staaf | Mar. 18, 1958 |
| 2,965,364 | Parker et al. | Dec. 20, 1960 |

FOREIGN PATENTS

| | | |
|---|---|---|
| 485,584 | Canada | Aug. 12, 1952 |
| 604,779 | Great Britain | July 9, 1948 |